United States Patent
Jung et al.

(10) Patent No.: US 7,676,037 B2
(45) Date of Patent: Mar. 9, 2010

(54) CRYPTOGRAPHIC METHOD CAPABLE OF PROTECTING ELLIPTIC CURVE CODE FROM SIDE CHANNEL ATTACKS

(75) Inventors: Bae-eun Jung, Suwon-si (KR);
Kyung-hee Lee, Yongin-si (KR);
Chae-hoon Lim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1478 days.

(21) Appl. No.: 11/014,905

(22) Filed: Dec. 20, 2004

(65) Prior Publication Data

US 2005/0169462 A1    Aug. 4, 2005

(30) Foreign Application Priority Data

Dec. 20, 2003   (KR) .................... 10-2003-0094243

(51) Int. Cl.
*H04L 9/28*    (2006.01)
*H04L 9/00*    (2006.01)
*H04L 9/08*    (2006.01)
*H04L 9/32*    (2006.01)

(52) U.S. Cl. .................... 380/28; 380/259; 380/282; 380/44; 713/168; 713/171; 713/174

(58) Field of Classification Search .................... 380/28
See application file for complete search history.

(56) References Cited

U.S. PATENT DOCUMENTS

| | | | |
|---|---|---|---|
| 6,477,254 B1* | 11/2002 | Miyazaki et al. | 380/286 |
| 6,978,378 B1* | 12/2005 | Koretz | 713/193 |
| 7,079,650 B1* | 7/2006 | Knudsen | 380/30 |
| 7,164,765 B2* | 1/2007 | Nishioka et al. | 380/30 |
| 7,505,585 B2* | 3/2009 | Solinas | 380/28 |
| 7,555,122 B2* | 6/2009 | Moller et al. | 380/30 |
| 2005/0084099 A1* | 4/2005 | Montgomery | 380/28 |
| 2006/0056619 A1* | 3/2006 | Billet et al. | 380/28 |
| 2006/0280296 A1* | 12/2006 | Vasyltsov et al. | 380/28 |

* cited by examiner

*Primary Examiner*—William R Korzuch
*Assistant Examiner*—Aravind K Moorthy
(74) *Attorney, Agent, or Firm*—Staas & Halsey LLP (57) ABSTRACT

An elliptic curve cryptography method which generates a public key for use in a communication encryption using an elliptic curve, including: changing a number of a secret key (d) of (k) bits to an odd number; encoding the secret key to yield an encoded secret key (d) in which a most significant bit (MSB) is (1) and a rest positional number is (1) or (−1); and computing the public key (Q=Dp) by multiplying the encoded secret key (d) by a predetermined point (P) on the elliptic curve by a scalar multiplication.

24 Claims, 5 Drawing Sheets

CRYPTOGRAPHIC METHOD CAPABLE OF PROTECTING ELLIPTIC CURVE CODE FROM SIDE CHANNEL ATTACKS

CROSS-REFERENCE TO RELATED APPLICATION

This application claims the benefit of Korean Patent Application No. 2003-94243 filed Dec. 20, 2003 in the Korean Intellectual Property Office, the disclosure of which is incorporated herein by reference.

BACKGROUND OF THE INVENTION

1. Field of the Invention

The present invention relates to a cryptographic method using elliptic curve, and more particularly, to an elliptic curve cryptographic method which is capable of preventing side channel attacks by applying an improved elliptic curve cryptographic algorithm using the encoding of a secret key.

2. Description of Related Art

Elliptic curve cryptosystem (ECC) was proposed by Victor Miller and Neal Koblitz in 1985. It is a public key cryptography scheme, and is getting increasing attention as the next generation cryptography technology for mobile environment.

The elliptic curve cryptography uses efficient algorithms, and 160 bit key, which is considerably smaller than the length requirement for the other public key cryptography schemes. Therefore, the elliptic curve cryptography system can be very effectively used in the smart card or wireless communication which has limited storage capacity and bandwidth. Wherever there is a conventional discrete logarithm-based public key cryptography applied, the elliptic curve cryptography can be compatibly applied.

The public key cryptography uses different keys for encryption and decryption, and according to this scheme, a sender receives its counterpart's public key, encrypts the received public key and sends it to the receiver, and the receiver decrypts the received data with its own secret key.

Private key information contains a pair of keys, that is, a public key and a secret key. Information such as individual's public key, elliptic curve information, and the resource and order of the elliptic curve cryptography groups are open information.

With the resource of the elliptic curve cryptography group "G" and the secret key "d", the public key can be computed by an elliptic curve algorithm "E=[d]G". "[d]G" is the sum of adding "G" by "d" times, which is the scalar multiplication.

"G" and "E" are points on the elliptic curve, and the elliptic curve represents the set of solutions (x, y) which satisfy the elliptic curve equation of the form on the finite field $GF(p^m)$:

$$y^2 + a_1 xy + a_2 y = x^3 + a_3 x^2 + a_4 x + a_5,$$

where counts "$a_1$" through "$a_5$" belong to the finite field $GF(p^m)$, and the characteristic "p" is a fraction.

Although not existent in the equation, there is a point at infinity "0" in addition to the points (x, y), which serves as an identity element to the operations of the points on the curve. The points on the elliptic curve together with the point at infinity form a commutative group with respect to addition. The addition on the elliptic curve refers to the operation of two different points "P", and the scalar multiplication refers to the operation of one point. Basically, the scalar multiplication is a doubling of a single point. Addition and doubling differs from each other in operation method thereof.

If characteristic "p" is not "2" or "3", but a prime number, the elliptic curve equation may change to different form such as $y^2 = x^3 + ax + b$, where "a" and "b" are elements of the finite field "GF(p)" and $4a^3 + 27b^2 \neq 0$. If the characteristic "p" is "2", the elliptic curve equation may change to a different form such as, $y^2 + xy = ^3 + ax^2 + b$ where "a" and "b" are elements of the finite field "GF(2")", and $b \neq 0$. The addition operation "$P+Q=(x_3, y_3)$" and the doubling operation "$2P=(x_4, y_4)$" of two points "$P=(x_1, y_1)$" and "$Q=(x_2, y_2)$" on the changed elliptic curve are computed by the following:

$$x_3 = \lambda_1^2 - x_1 - x_2 \qquad \text{[Formulae 1]}$$

$$y_3 = \lambda_1(x_1 - x_3) - y_1, \lambda_1 = \frac{y_2 - y_1}{x_2 - x_1}$$

$$x_4 = \lambda_2^2 - x_1 - x_2$$

$$y_4 = \lambda_1(x_1 - x_4) - y_1, \lambda_2 = \frac{3x_1^2 + a}{2y_1}$$

As referred to by the above mathematical formulae, addition and doubling use different operations on the elliptic curve, and this fact can be utilized by the side channel attacks.

The 'Side channel attack' was introduced by Kocher in 1996. This addressed the problem of insecurity of secret key, in which the secret key is accessed even when the encryption algorithms are mathematically safe by using simple power analysis (SPA) or differential power analysis (DPA) which analyzes the time or power consumption for the operation of algorithms.

Accessing the secret key is not expected in the stage of executing the encryption algorithm, while inputs and encrypted outputs may be accessed. However, there is a leak of the secret key by the side channel attacks which utilize the fact that a certain number of encryption operations are performed using the secret key in the devices such as smart card, and thus the additional related information such as time and power consumption for the operation is obtainable.

A secret key for use in the execution of elliptic curve encryption algorithm is generated during the decoding process and electronic verification process. In decoding, a value "[d]P" is computed by the scalar multiplication of a point "P" on the elliptic curve and the private key "d".

Considering that the scalar multiplication is performed with respect to the respective bits of the secret key "d" by addition and doubling, the respective bits of the secret key can be obtained by measuring the time or power consumption for the operations of the respective bits. This means that the secret key can be known based on the information such as time or power consumption for the operation.

SPA obtains information about the secret key, by measuring the power consumption for the encryption algorithm, and DPA collects the sampling data of the power consumption and analyzes the sampling data through digital signal interpretation and statistical methods.

Currently, a plurality of algorithms and devices are available to cope with the side channel attacks such as SPA and DPA. However, adding new devices to the hardware would bring in disadvantages such as increased requirement for capacity and power, which subsequently increases the volume and weight, and unit price of the encryption device.

Meanwhile, other types of algorithms are also available to cope with the side channel attacks, which include: an algorithm performing the same number of addition and doubling per unit; an algorithm using randomizer; and an algorithm using a modified finite operation which is the sub-operation of the scalar multiplication.

More specifically, the SPA obtains the secret information by utilizing the fact that only the doubling is performed when the private key's bit is zero '0' and both the doubling and addition are performed when the bit is one '1.' Therefore, the SPA obtains the secret information by measuring the power consumption and confirming whether the addition has been performed or not. The algorithm performing the same number of doubling and addition aims to prevent this information leakage by performing the addition even when the bit is zero '0.'

The result of the above-mentioned 'dummy' operation of the modified algorithm of the scalar multiplication may not be used after the completion of the operation. Alternatively, the Montgomery's algorithm, or a coding process of the private key, may be modified such that doubling and addition can be performed by equal times in every window.

However, the 'dummy' operation may not be safe if the attack utilizes the fact that the identity element is added when the most significant bit (MSB) is zero '0' and the points on the elliptic curve are added when the MSB is one '1.' The fact that the result of dummy operation is not used can also expose the system to the side channel attacks.

A Montgomery algorithm uses different points for operation, depending on whether the MSB is "0" or "1", and therefore, it is not completely protected from the side channel attacks. Furthermore, the method of adopting new coding method for private key and iterating doubling and addition by identical number of times in every window, can only be used for the fixed window, and also requires twice the memory capacity than the window which does not consider SPA. Furthermore, because of the fact that the Montgomery algorithm uses identity element in the initial stage, it is also weak to the SPA.

The randomization usually comprises the operations of: projecting the points on the elliptic curve into randomly-selected similar-shaped curves; performing scalar multiplication with respect to the private key; and mapping the result of the scaler multiplication into the point on the elliptic curve. This method, however, usually has increase in operation load, and is weak to the DPA when applied with the window method. Additionally, the method is not applicable to all types of curves generally available, or not usable to the elliptic curve cryptography for certain types of finite field.

Another approach suggests to vary the finite field operation, which is sub-operation of the scalar multiplication. However, this approach has a degraded efficiency because of the requirement for different designs according to different operations of the addition and doubling in the computation in the finite field. Additionally, because this approach is applicable to certain limited types of curves, it is not generally applicable.

BRIEF SUMMARY

The present invention has been developed in order to solve the above and/or other drawbacks and other problems associated with the conventional arrangement. An aspect of the present invention is to provide an elliptic cryptography method which is safe from the side channel attacks on the elliptic curve cryptography algorithms, and is capable of minimizing requirements for computations and loads of memory. Accordingly, the elliptic cryptography method according to the present invention provides both safety and efficiency.

According to an aspect of the present invention, there is provided an elliptic curve cryptography method which performs scalar multiplication using an elliptical curve for use in a communication encryption, including: changing a number of a secret key (d) of (k) bits to an odd number; encoding the secret key to yield an encoded secret key (d) in which a most significant bit (MSB) is (1) and a rest positional number is (1) or (−1); and computing the public key (Q=Dp) by multiplying the encoded secret key (d) by a predetermined point (P) on the elliptic curve by a scalar multiplication.

In the changing, the secret key may be changed to the odd number by adding to the secret key an order number (n) of a group of points on the elliptic curve. The encoding may include: setting the MSB (dk) of the encoded secret key (d=<di>) of the secret key (d=<di>) to (1); subtracting (1) from (i) and determining whether (di+1) is (0); and setting (di) to (−1) when (di+1) is (0), and setting (di) to (1) when (di+1) is not (0).

The elliptic curve cryptography method may further include determining whether (i) is (0), wherein, when (i) is not (0), the process returns to the subtracting. The elliptic curve cryptography method may further include outputting the encoded secret key ($\underline{d}=<\underline{d}_i>$) when (i) is (0). (−1) may be stored as (0) among the respective positional numbers of the encoded secret key ($\underline{d}$).

The encoded secret key ($\underline{d}$) may be computed by shifting once the respective positional numbers of the secret key (d) from the upper bits to the lower bits and setting a MSB to (1).

The public key computing may include: setting (Q) as (P), and (i) as (k−1) with respect to the encoded secret key ($\underline{d}=<\underline{d}_i>$); updating (Q) with the result of computing (2Q); and updating (Q) with the result of computing (Q+P) when ($\underline{d}_i$) is (1), and with the result of computing (Q−P) when ($\underline{d}_i$) is not (1). The elliptic curve cryptography method according to claim 8, further comprising determining whether (i) is (0), wherein, when (i) is not (0), (i) is updated to the result of the subtracting (1) from (i).

The elliptic curve cryptography method may further include outputting (Q) as the public key when (i) is (0).

The public key computing may include: setting (Q) to (P) and setting (i) to (0) with respect to the encoded secret key (d=<di>); computing (Q+P) and updating (Q) when (di) is (1), and computing (Q−P) and updating (Q) when (di) is not (1); and computing (2Q) and updating (Q).

The elliptic curve cryptography method may further include determining whether (i) is (k−1), wherein, when (i) is not (k−1), (i) added with (1) is set to (i) and the operation returns to the computing (Q+P). The elliptic curve cryptography method may further include outputting (0) as the public key when (i) is (k−1).

The public key computing includes: setting (Q[0]) as (P), setting (Q[i]) as (2P) and setting (i) as (k−1) with respect to the encoded secret key ($\underline{d}=<\underline{d}_i>$); adding (Q[0]) and (Q[1]) according to an Montgomery algorithm and setting (Q[0]) as the result of the addition; and setting Q[1] with the result of doubling (Q[0]) according to the Montgomery algorithm when both of ($\underline{d}_i$) and ($\underline{d}_{i-1}$) are (1), and setting Q[1] with the result of doubling (Q[1]) according to the Montgomery algorithm when one of ($\underline{d}_i$) and ($\underline{d}_{i-1}$) is not (1).

The elliptic curve cryptography method may further include determining whether (i) is (1), wherein, when (i) is not (1), (i) is updated to the result of subtracting (1) from (i). The elliptic curve cryptography method may further include outputting the result of adding (Q[0]) with (Q[1]) according to the Montgomery algorithm as the public key (Q) when (i) is (1).

The public key computing may include: dividing (k+1) by the window size (w) and setting the remainder of the division to be (r) with respect to the encoded secret key ($\underline{d}=<\underline{d}_i>$), (w) being set to (r) when the remainder of the division is (0); setting (T[j]) of an integer (j), which is at least equal to (0) and less than ($2^{w-1}$), to be ((2j+1)P); updating (j) to a result of a multiplication ($d_{k-1}d_{k-2}, \ldots, d_{k-w+1}$), updating (Q) to (T[j]), and updating (i) to (k−w); updating (Q) to the result of multiplying (Q) by (w) according to the scalar multiplication; setting results of multiplication ($\underline{d}_{i-1}\underline{d}_{i-2}, \ldots, \underline{d}_{k-w+1}$) to (e), and updating (e) to (j) when ($\underline{d}_j$) is (1), and updating (j) to ($e'=2^{w-1}-1-e$) when ($\underline{d}_j$) is not (1); and computing (Q+T[j]) and updating (Q) when ($\underline{d}_j$) is (1), and computing (Q−T[j]) and updating (Q) if ($\underline{d}_j$) is not (1).

The elliptic curve cryptography method may further include determining whether (i) is (r+1−w), wherein, when (i) is not (r+1−w), (i) is updated to the result of subtracting (1) from (i) and the operation returns to the encoding. The elliptic curve cryptography method may further include, when (i) is (r+1−w): updating (Q) to the result of multiplying (0) by (r) according to the scalar multiplication; updating (e) to results of multiplication ($\underline{d}_{r-1}\underline{d}_{r-2}, \ldots, \underline{d}_0$), updating (j) to (e) if ($d_j$) is (1), and updating (j)−" to ($e'=2^{w-1}-1-e$" if "$d_j$) is not (1); and outputting (Q+T[j]) as (Q) if ($d_j$) is (1), and outputting (Q−T[j]) as the public key (Q) when ($d_j$) is not (1).

According to another aspect of the present invention, there is provided an elliptic curve cryptography method which performs scalar multiplication usable in communication encryption using an elliptic curve, including: changing a number of a secret key to an odd number; encoding the secret key to yield an encoded secret key in which a most significant bit (MSB) is 1 and a rest positional number is 1 or −1; and computing the public key by multiplying the encoded secret key by a predetermined point on the elliptic curve by scalar multiplication.

According to another aspect of the present invention, there is provided a method of preventing leakage of a secret key during encryption and decryption during communication using elliptical curve cryptography which performs scalar multiplication usable in the communication, including: changing a number of a secret key to an odd number; encoding the secret key to yield an encoded secret key in which a most significant bit (MSB) is 1 and a rest positional number is 1 or −1; and computing the public key by multiplying the encoded secret key by a predetermined point on the elliptic curve by scalar multiplication.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENT

Figure 1:
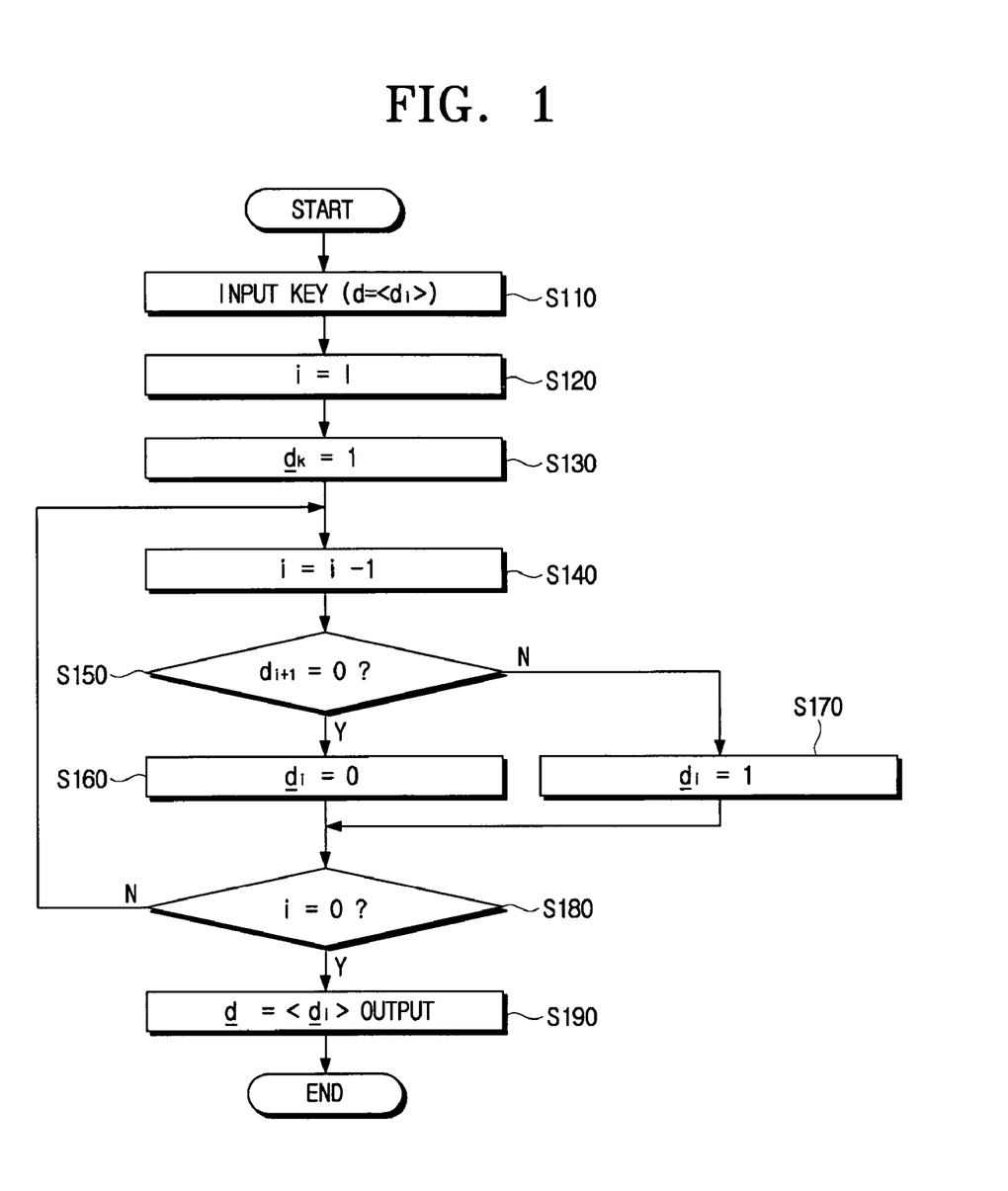
FIG. 1 is a flowchart illustrating the secret key encoding for the elliptic curve cryptography according to an embodiment of the present invention.

FIG. 1 is a flowchart illustrating secret key encoding for elliptic curve cryptography according to an embodiment of the present invention. The secret key encoding encodes a private key "d", which is used in the computation of scalar multiplication algorithm "Q=[d]P" of the elliptic curve cryptography, into "±1."

When the elliptic curve cryptography according to the present embodiment of the present invention is used, if "d" is an even number, "d" is changed to an odd number prior to the secret key encoding. This can be done by adding the order number "n" to "d" using "[d+n]P=dP+nP=dP" considering, "nP=0", of the order number "n" of the elliptic curve group. Therefore, "d" is always an odd number by "d:=d+n."

Accordingly, if "n" is "k" bit, "d" after change may be "k+1" bit. Hereinbelow, "−1" will be referred to as "$\underline{1}$", and "a" number of consecutive "0"s will be referred to as "$0^a$." Accordingly, "$0^a1$" can be represented as "$1\underline{1}^a$." That is, "00001" becomes "$1\underline{1111}$." "1011001" becomes "$11\underline{1}1\underline{111}$."

Hereinbelow, the encoded value of the secret key "d" will be referred to as "$\underline{d}$", and "1" appearing at the positional numbers of "$\underline{d}$" will be referred to as "0" for the convenience in memory storage. A certain value "d" of "k" bit is expressed as "$\underline{d}$" of "1 ($\geqq$k)" bit by the encoding process, and MSB of "$\underline{d}$" is always "1." Because "0" bit does not occur with respect to the encoded secret key "$\underline{d}$" according to the encoding of the present invention, addition (or subtraction) is performed with respect to all bits.

Although one bit is increased by the encoding process, because the MSB is always "1", the number of loops of the scalar multiplication algorithm does not exceed the number of the conventional cases.

Referring to FIG. 1, first, a secret key "d" is inputted in operation S110. In the secret key "$d=<d_i>$", "$d_i$" is either "0" or "1", and "$d=<d_i>$" is expressed in the unit of binary number. "i" is set to "1" in operation S120, and the MSB "$d_i$" is set to "1" in operation S130. Next, "i" is updated to "i−1" in operation S140, "i" is subtracted one by one, the loop with respect to "i" begins, and it is determined whether "$d_{i+1}$" is "0" in operation S150.

If "$d_{i+1}$" is "0", "$\underline{d}_i$" becomes "0" in operation S160, and if "$d_{i+1}$" is not "0", "$\underline{d}_i$" becomes "1" in operation S170. "0" in "$\underline{d}_i$" denotes "−1." Next, it is determined whether "i" is "0" in operation S180, and operation returns to the operation S140 and repeats the loop until "i" becomes "0." If "i" becomes "0", "$\underline{d}=<\underline{d}_i>$" is outputted in operation S190.

Figure 2:
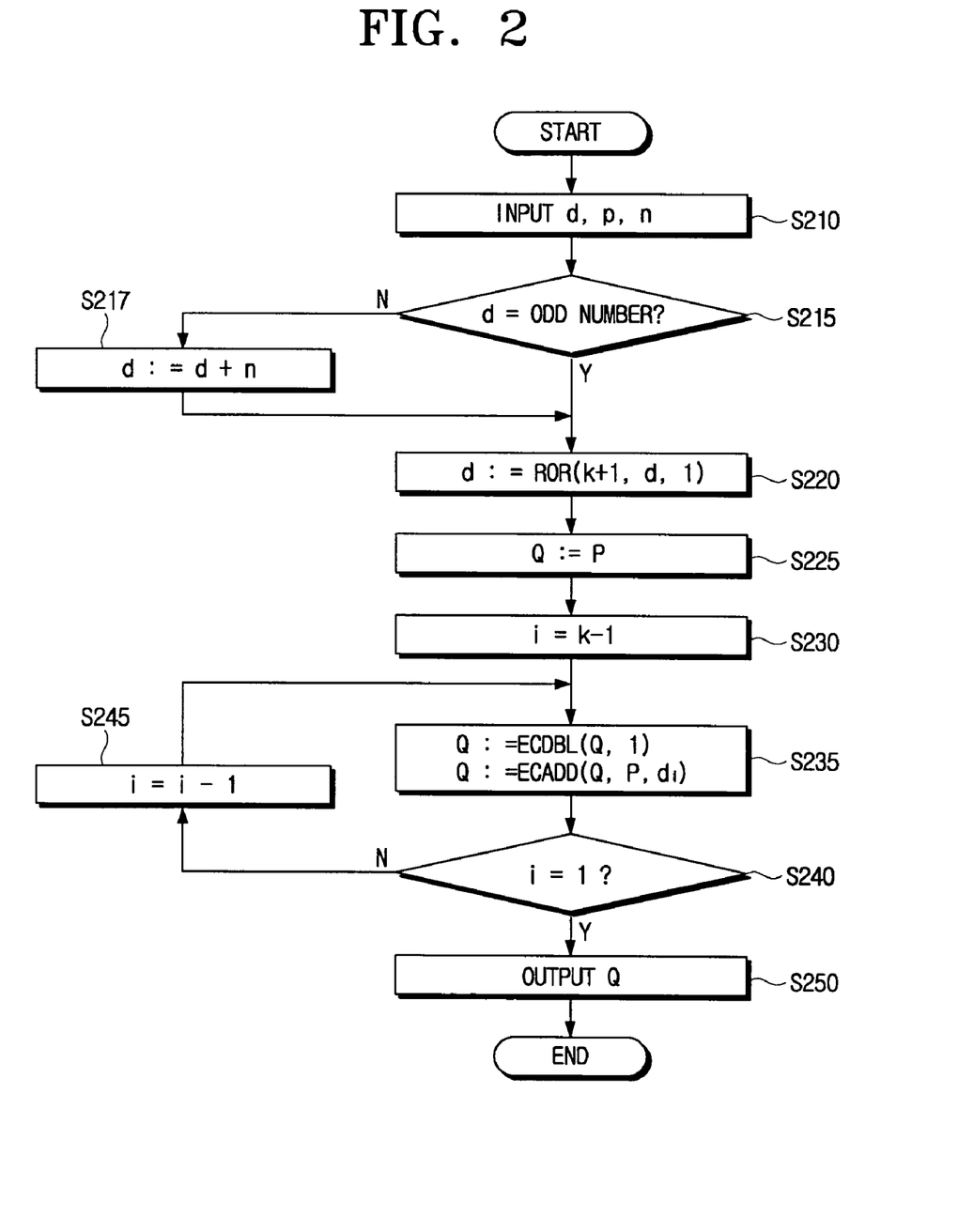
FIG. 2 is a flowchart illustrating an exemplary scalar multiplication algorithm usable with te embodiment of FIG. 1.

FIG. 2 is a flowchart illustrating an example of the scalar multiplication algorithm for the elliptic curve cryptography according to the present embodiment. More specifically, the algorithm shown in FIG. 2 is a signed binary right-to-left algorithm.

It is hereinbelow assumed that when bit "s" is "0", "ECADD(P, Q, s)=P−!", and if bit "s" is "1", "ECADD(P, Q, s)=P+Q." Further, ECDBL(Q, w)=$2^W Q$", and "ROR(1, d, 1)" is the result of encoding "d" with bit "1."

First, the scalar multiplication algorithm is inputted with "d, P, n" in operation S210. Next, it is determined whether the input "d" of "k" bit is an odd number in operation S215. If not, "d" is added with the order number "n", and therefore, changed to the odd number by "d:d+n" in operation S217. Accordingly, the algorithm is executed with respect to the odd number "d." The above-mentioned encoding is performed with respect to "d", and "$\underline{d}$=ROR(k+1, d, 1)" is obtained, and "d" is set to the resultant value in operation S220.

First, "P" is substituted in "0" in operation S225, and "k−1" is substituted in "i" in operation S230. Next, the operation is repeated with respect to "$d_i$" until "i" becomes "1." During the execution of one loop, "ECDBL(Q, 1)=2Q", i.e., the result of the doubling is stored in "Q", and "Q−P" or "Q+P" is stored in "Q" in accordance with "ECADD(Q, P, $d_i$), that is, in accordance with "$d_i$." As a result, "Q" is updated in operation S235. Upon completing the loop and when "i=1", "Q" is outputted, and when "i" is not "1", "i−1" is substituted in "i" in operation S245, and the operation returns to the operation S235 and repeats the operations until "i=1."

Figure 3:
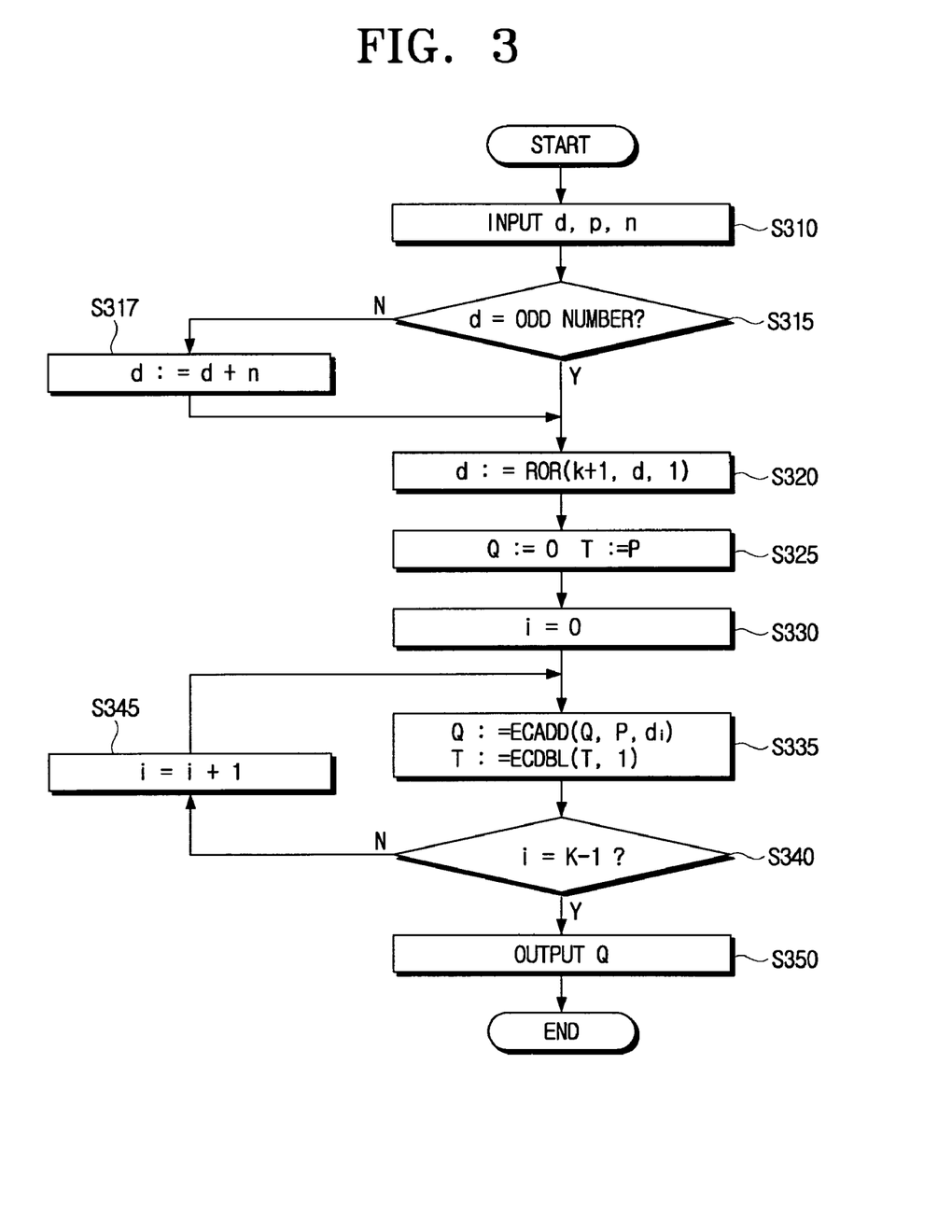
FIG. 3 is a flowchart illustrating another exemplary scalar multiplication algorithm usable with te embodiment of FIG. 1.

FIG. 3 is a flowchart illustrating another example of the scalar multiplication algorithm for elliptic curve cryptography according to the present embodiment. More specifically, the algorithm illustrating in FIG. 3 is a signed binary left-to-right algorithm.

Referring to FIG. 3, first, "d, P, n" are inputted to the scalar multiplication algorithm in operation S310. Then it is determined whether the input "d" is an odd number in operation S315, and if not, "d" is added with the order number "n" (d:=d+n) to become an odd number in operation S317. The above-mentioned encoding is performed with respect to "d", and "$\underline{d}$=ROR(k+1, d, 1)" is obtained, and "d" is set to the result of "$\underline{d}$=ROR(k+1, d, 1)" in operation S320.

Next, "0" is substituted in "0", and "P" is substituted in 'T' in operation S325, and "0" is substituted in "i" in operation S330. Then the operation is repeated with respect to "$d_i$" until "i" becomes "k−1." During the execution of one loop, "Q−T" or "Q+T" is calculated and stored in "Q" in accordance with "ECADD(Q, T, $d_i$), i.e., in accordance with "$d_i$", and "ECDBL(T, 1)=2T", that is, the result of doubling 'T', is stored in 'T' in operation S335. Upon completing the loop and when "i=k−1", "Q" is outputted in operation S350, and "i" is not "k−i", "i+1" is substituted in "i" in operation S345, and the operation returns to the operation S335 and repeated until "i=k−1."

Figure 4:
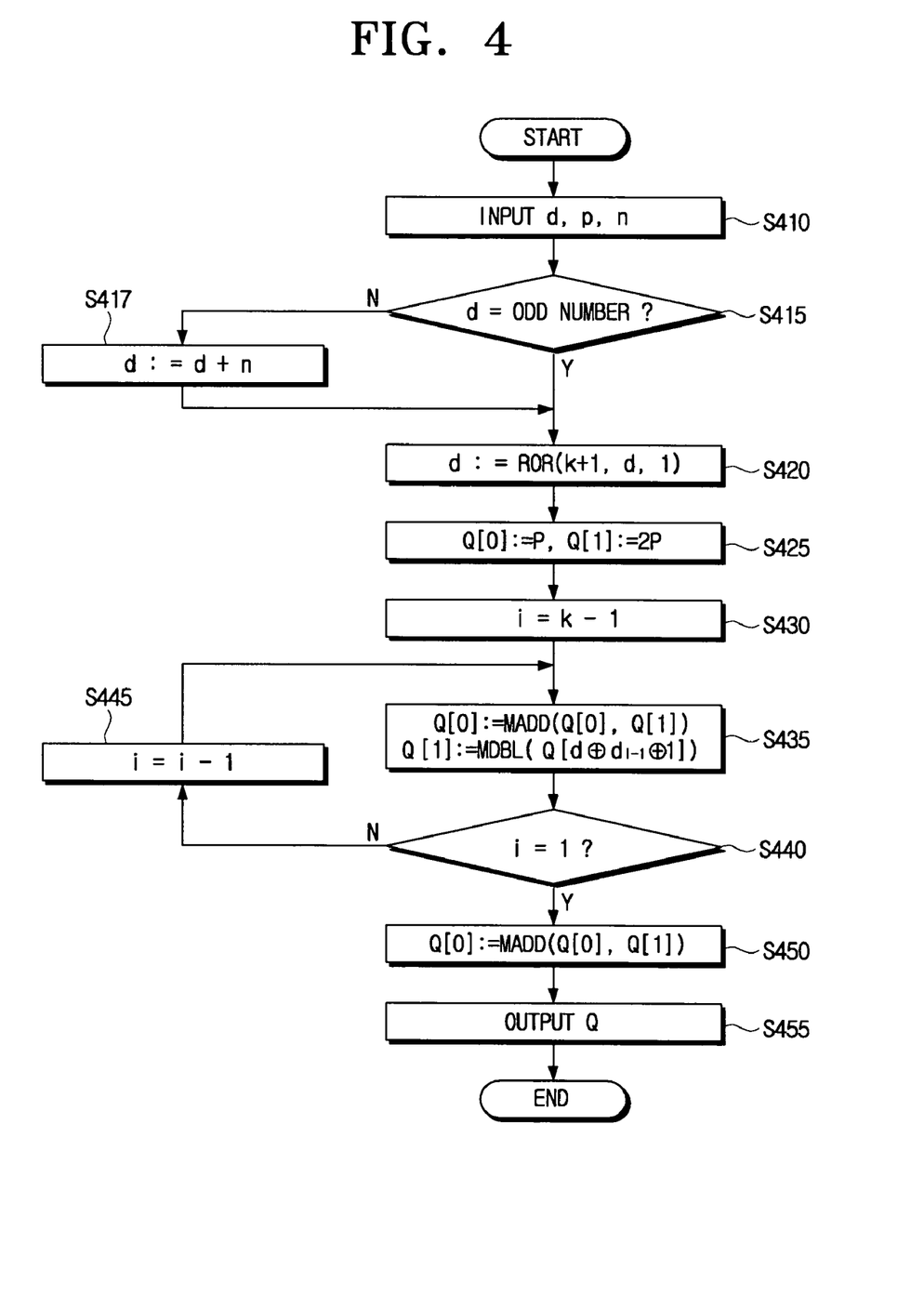
FIG. 4 is a flowchart illustrating another exemplary scalar multiplication algorithm usable with te embodiment of FIG. 1.

FIG. 4 is a flowchart illustrating another example of the scalar multiplication algorithm for elliptic curve cryptography according to the present embodiment. More specifically, the algorithm illustrated in FIG. 4 is a modified form of general Montgomery algorithm, and hereinbelow, it will be called "encoded Montgomery algorithm."

Referring to FIG. 4, first, "d, P, n" are inputted to the scalar multiplication algorithm in operation S410. Then it is determined whether the input "d" is an odd number in operation S415, and if not, "d" is added with the order number "n" (d:=d+n) to becomes an odd number in operation S417. Then the above-mentioned encoding is performed with respect to "d" to obtain "$\underline{d}$=ROR(k+1, d, 1)", and "d" is set to the result of "$\underline{d}$=ROR(k+1, d, 1)" in operation S420.

First, with respect to "d", "P" is substituted in "Q[0]", and "2P" is substituted in "Q[1]" in operation S425, and "k−1" is substituted in "i" in operation S430. Next, the operation is iterated with "$d_i$" and "$d_{i-1}$" until "i" becomes "1." During the execution of one loop, the result of "MADD(Q[0], Q[1])" is stored in "Q[0]", and the result of "MDBL(Q[$d_i$*$d_{i-1}$*1])" is stored in "Q[1]" in operation S435. "MADD(Q[0], Q[1])" denotes the result of addition of two points according to the Montgomery algorithm, and "MDBL(Q[$d_i$*$d_{i-1}$*1])" denotes the result of doubling according to the Montgomery algorithm. Additionally, "*" denotes XOR operation. As a result, if "$d_i$=$d_{i-1}$=1", "$d_i$*$d_{i-1}$*1=1", and if not, "$d_i$*$d_{i-1}$*1=0." Upon completion of the loop and when "i=1", "MADD(Q[0], Q[1])" is stored in "Q[0]" in operation S450, and "Q=Q[0]" is outputted in operation S455. Meanwhile, if "i" is not "1", "i−1" is substituted in "i" in operation S445, and the operation returns to the operation S435 and repeats until "i=1."

Figure 5:
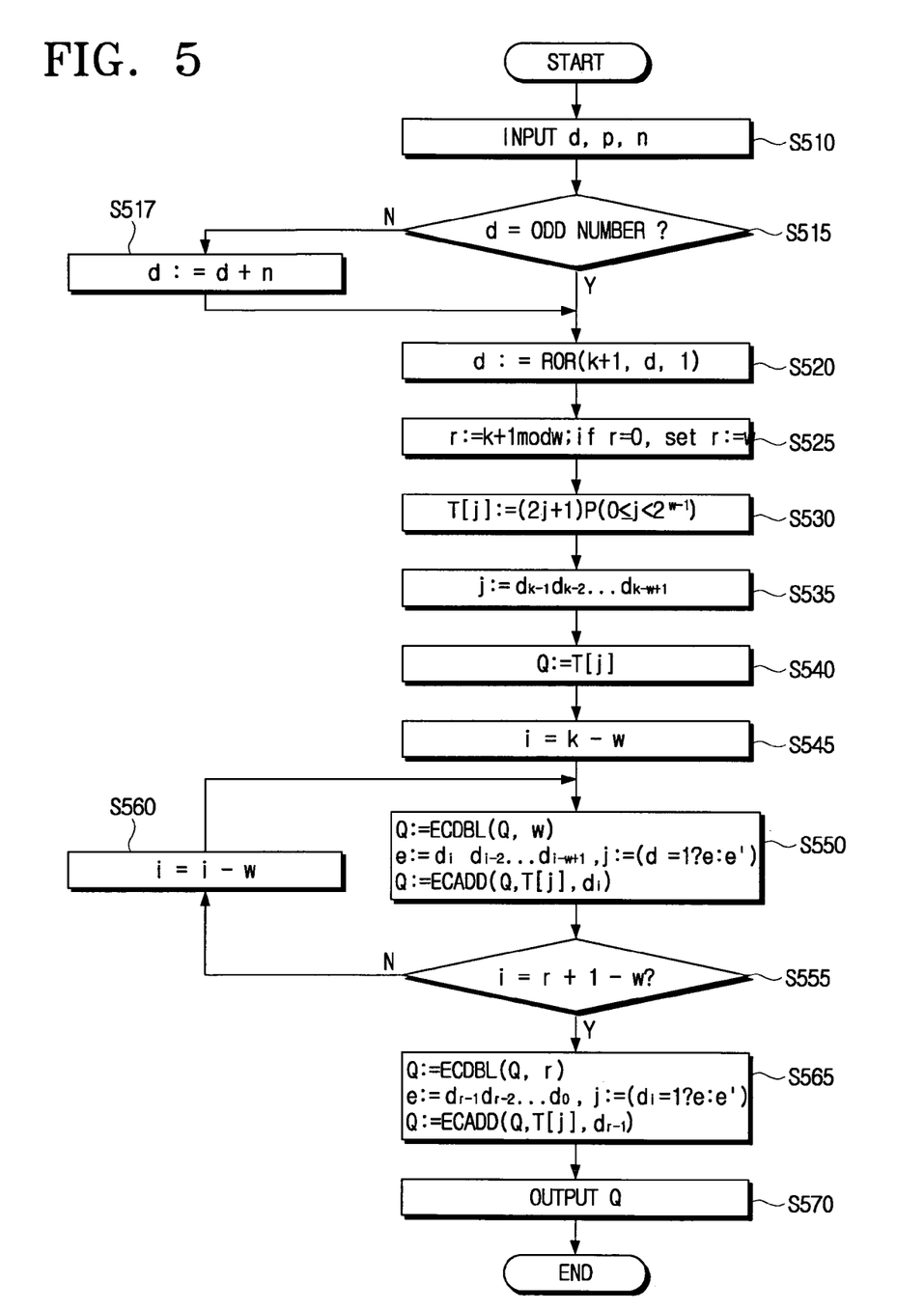
FIG. 5 is a flowchart illustrating another exemplary scalar multiplication algorithm usable with te embodiment of FIG. 1.

FIG. 5 illustrates another example of the scalar multiplication algorithm for elliptic curve cryptography according to the present embodiment. More specifically, the algorithm illustrated in FIG. 5 is a modified form of a fixed code windowing, which is the fixed code windowing applying the encoding process.

Referring to FIG. 5, first, "d, P, n" are inputted to the scalar multiplication algorithm in operation S510. The it is determined whether the input "d" is an odd number in operation S515, and if not, "d" is added with the order number "n" (d:=d+n) to becomes an odd number in operation S517. The above-mentioned encoding is performed with respect to "d" to obtain "$\underline{d}$=ROR(k+1, d, 1)" and "d" is set to the result of "$\underline{d}$=ROR(k+1, d, 1)" in operation S520.

First, "r" is set to a remainder of dividing "k+1" by 'w', and if it is "0", "r" is set to 'w' in operation S525. (2j+1)P is calculated and substituted in "T[j]" in operation S530, and here, "$0 \leq j < 2^{w-1}$." "$d_{k-1}, d_{k-2}, \ldots, d_{k-w+1}$" are calculated and substituted in "j" in operation S535, and "T[j]" is substituted in "Q" in operation S540. Then "i" is set to "k-w" in operation S545, and the scalar multiplication is repeated with respect to "$d_i$" until "i" becomes "r+1−w." During the execution of one loop, "ECDBL(Q, w)" is calculated and substituted to "Q", "$d_{r-1}d_{r-2}, \ldots, d_{i-w+1}$" are calculated and substituted to "e", "($d_i$=0?e:e')" is substituted in "j", and "ECADD(Q, T[j], $d_i$)" is calculated and substituted in "0" in operation S550. "($d_i$=0?e:e')" is a certain function in which, if "$d_i$=0", "e" is substituted in "j", and if "$d_i \neq 0$", "e=$e^{w-1}$−1−e" is substituted in "j." It is determined whether "i" is "r1−w" in operation S555, and if "i" is not "r+1−w", "i" is set to "i−w" in operation S560, and the operation returns to the operation S545 and the loop repeats until "i" becomes "r+1−w." If "i" becomes "r+1−w", finally, "ECDBL(Q, r)" is calculated and substituted in "Q", "$d_{r-1}, d_{r-2}, \ldots, d_0$" is calculated and substituted in "e", "($d_i$=0?e:e')" is substituted in "j", "ECADD(Q, T[j], $d_{r-1}$)" is calculated and substituted in "Q" in operation S565, and the final "Q" is outputted in operation S570.

According to the fixed code windowing, $(X_1, Y_1, Z_1)+(x_2, Y_2, 1)=(X_3, Y_3, Z_3)$ is calculated by the following, with $(x_2, y_2, 1)$ being a pre-calculated point, and $(X_1, Y_1, Z_1)$ being a randomly-selected point:

$$T_1 = y_2 Z_1^3, T_2 = x_2 Z_1^3$$

$$A = Y_1 + T_1, B = Y_1 - T_1, C = X_1 - T_2$$

$$Z_3 = DZ_1, X_3 = B^2 - CD^2, 2Y_3 = B(CD^2 - 2X_3) - AD^3 \quad \text{[Formulae 2]}$$

The fixed code windowing is, however, weak to the differential power analysis (DPA), which utilizes the fact that the pre-calculated points "$y_2$" and "$x_2$" are multiplied in the above formulae 2.

Accordingly, the embodiment of the present invention modifies the fixed code windowing by applying the encoding, and therefore obtains randomly-selected points for the scalar multiplication. The following formulae 3 are used in the computation on the GF(P), while the formulae 4 are used in the computation on the $GF(2^m)$:

$$T_0 = (y_2 + Z_1)Z_1 - Z_1^2, T_1 = T_0 Z_1^2, T_2 = (x_2 + T_0)Z_1^2 - T_1$$

$$A = Y_1 + T_1, B = Y_1 - T_1, C = X_1 - T_2$$

$$Z_3=DZ_1, X_3=B^2-CD^2, 2Y_3=B(CD^2-2X_3)-AD^3 \quad \text{[Formulae 3]}$$

$$T_0=(y_2+Z_1)Z_1+Z_1^2, A=X_1+T_1, B=AZ, Z_3=B^2$$

$$C=A^2(B+aZ_1^2), T_2=(y_2+A_2)Z_1^2+Z_3, D=Y_1+T_2, E=BD$$

$$X_3=D^2+C+E, T_3=(y_2+Z_3)Z_3+Z_3, F=X_3+T_3$$

$$T_4=(x_2+F)Z_3+FZ_3, G=X_3+T_4, Y_3=EG+FZ_3 \quad \text{[Formulae 4]}$$

Instead of multiplying the pre-calculated points "y$_2$" and "x$_2$", randomly-selected points are added to each other and then scalar multiplication is performed. As a result, the algorithm can be protected from the DPA attacks.

As described, the elliptic curve cryptography using elliptic curve according to the present embodiment can be used with the smart card, or with the transmitting and receiving sides for the communication therebetween, provide a protection against the side channel attacks.

A receiving side selects its secret key "d" and a certain point "P" on the elliptic curve, and generates a public key "Q=dP" by using the elliptic curve cryptography according to the present invention, and then makes public the selected point "P" and the public key.

A transmitting side selects a transmission-intended plaintext "m" and an integer "c" for use in the encryption of the plaintext "m", and computes a ciphertext "C1, C2)", i.e., "C1=cP" and "C2=cQ+m", and transmits the computed results to the receiving side.

The receiving side receives the transmission text (C1, C2), and computes "dC1" by using the elliptic curve cryptography according to an embodiment of the present invention. As a result, the encrypted text is decoded by "C2−dC1=[cQ+m]−dcP=[cdP+m]−dcP=m", and the plaintext "m" is computed. According to the present invention, the private key is expressed by "1" bit and "−1" bit. Because the operations performed are always either doubling and addition, or doubling and subtraction, the algorithm is immune to the SPA attacks. Additionally, because the MSB of the private key is always set to "1", operation with respect to the identity element can be omitted in the initial stage, and therefore, side channel attacks can be more effectively dealt with, and the requirement for memory capacity is reduced.

According to the disclosed embodiment of the present invention, with the fixed code windowing algorithm employing the encoding process, the values of the window are always expressed in the odd number after the encoding. Therefore, the requirement for memory storage in the conventional cases for the storage of pre-calculated points, is reduced approximately to a half, and therefore, memory utilization increases. Furthermore, because window is immune to the side channel attacks, higher operation efficiency can be provided.

Also, in the scalar multiplication algorithm using encoding process, the MSB of the secret key is set to "1", and the secret key is encoded either "1" or "−1" and applied to a modified scalar multiplication algorithm. As a result, the elliptic curve cryptography, which requires less memory use, provides more efficient operation, and is immune to the side channel attacks, can be provided.

Furthermore, because of the random coordinates conversion skill, which is generally used for all types of curves to deal with DPA attacks, a scalar multiplication algorithm immune to the side channel attacks is provided, and particularly, an operation efficient for the fixed code windowing and also immune to the side channel attacks, is provided. As a result, leakage of secret key can be prevented during encryption and decryption for communication at transmitting and receiving sides of a communication system.

Although an embodiment of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. An elliptic curve cryptography method which generates a public key for use in a communication encryption using an elliptic curve, comprising:
    changing a number of a secret key (d) of (k) bits to an odd number;
    using at least one processing device encoding the secret key to yield an encoded secret key ($\underline{d}$) in which a most significant bit (MSB) is (1) and a rest positional number is (1) or (−1); and
    computing the public key (Q=$\underline{D}$p) by multiplying the encoded secret key ($\underline{d}$) by a predetermined point (P) on the elliptic curve by a scalar multiplication.

2. The elliptic curve cryptography method according to claim 1, wherein, in the changing, the secret key is changed to the odd number by adding to the secret key an order number (n) of a group of points on the elliptic curve.

3. The elliptic curve cryptography method according to claim 1, wherein the encoding includes:
    setting the MSB ($\underline{d}_k$) of the encoded secret key (d=<$\underline{d}_i$>) of the secret (d=<$\underline{d}_i$>) to (1);
    subtracting (1) from (i) and determining whether ($d_{i+1}$) is (0); and
    setting ($\underline{d}_i$) to (−1) when ($d_{i+1}$) is (0), and setting ($\underline{d}_i$) to (1) when ($d_{i+1}$) is not (0).

4. The elliptic curve cryptography method according to claim 3, further comprising determining whether (i) is (0), wherein, when (i) is not (0), the process returns to the subtracting.

5. The elliptic curve cryptography method according to claim 3, further comprising outputting the encoded secret key ($\underline{d}$=<$\underline{d}_i$>) when (i) is (0).

6. The elliptic curve cryptography method according to claim 1, wherein (−1) is stored as (0) among the respective positional numbers of the encoded secret key ($\underline{d}$).

7. The elliptic curve cryptography method according to claim 6, wherein the encoded secret key ($\underline{d}$) is computed by shifting once the respective positional numbers of the secret key (d) from the upper bits to the lower bits and setting a MSB to (1).

8. The elliptic curve cryptography method according to claim 1, wherein the public key computing includes:
    setting (Q) as (P), and (i) as (k−1) with respect to the encoded secret key ($\underline{d}$=<$\underline{d}_i$>);
    updating (Q) with the result of computing (2Q); and
    updating (Q) with the result of computing (Q+P) when ($\underline{d}_i$) is (1), and with the result of computing (Q−P) when ($\underline{d}_i$) is not (1).

9. The elliptic curve cryptography method according to claim 8, further comprising determining whether (i) is (0), wherein, when (i) is not (0), (i) is updated to the result of the subtracting (1) from (i).

10. The elliptic curve cryptography method according to claim 9, further comprising outputting (Q) as the public key when (i) is (0).

11. The elliptic curve cryptography method according to claim 1, wherein the public key computing includes:
    setting (Q) to (P) and setting (i) to (0) with respect to the encoded secret key ($\underline{d}$=<$\underline{d}_i$>);

computing (Q+P) and updating (Q) when ($\underline{d}_i$) is (1), and computing (Q−P) and updating (Q) when ($\underline{d}_i$) is not (1); and computing (2Q) and updating (Q).

12. The elliptic curve cryptography method according to claim 11, further comprising determining whether (i) is (k−1), wherein, when (i) is not (k−1), (i) added with (1) is set to (i) and the operation returns to the computing (Q+P).

13. The elliptic curve cryptography method according to claim 12, further comprising outputting (Q) as the public key when (i) is (k−1).

14. The elliptic curve cryptography method according to claim 1, wherein the public key computing includes:

setting (Q[0]) as (P), setting (Q[1]) as (2P) and setting (i) as (k−1) with respect to the encoded secret key ($\underline{d}=\langle \underline{d}_i \rangle$);

adding (Q[0]) and (Q[1]) according to an Montgomery algorithm and setting (Q[0]) as the result of the addition; and setting Q[1] with the result of doubling (Q[0]) according to the Montgomery algorithm when both of ($\underline{d}_i$) and ($\underline{d}_{i-1}$) are (1), and setting Q[1] with the result of doubling (Q[1]) according to the Montgomery algorithm when one of ($\underline{d}_i$) and ($\underline{d}_{i-1}$) is not (1).

15. The elliptic curve cryptography method according to claim 14, further comprising determining whether (i) is (1), wherein, when (i) is not (1), (i) is updated to the result of subtracting (1) from (i).

16. The elliptic curve cryptography method according to claim 15, further comprising outputting the result of adding (Q[0]) with (Q[1]) according to the Montgomery algorithm as the public key (Q) when (i) is (1).

17. The elliptic curve cryptography method according to claim 1, wherein the public key computing includes:

dividing (k+1) by the window size (w) and setting the remainder of the division to be (r) with respect to the encoded secret key ($\underline{d}=\langle \underline{d}_i \rangle$), (w) being set to (r) when the remainder of the division is (0);

setting (T[j]) of an integer (j), which is at least equal to (0) and less than ($2^{w-1}$), to be ((2j+1)P);

updating (j) to a result of a multiplication ($d_{k-1}d_{k-2}, \ldots, d_{k-w+1}$), updating (Q) to (T[j]), and updating (i) to (k−w);

updating (Q) to the result of multiplying (Q) by (w) according to the scalar multiplication;

setting results of multiplication ($\underline{d}_{i-1}\underline{d}_{i-2}, \ldots, \underline{d}_{i-w+1}$) to (e), and updating (e) to (j) when ($\underline{d}_i$) is (1), and updating (j) to (e'=$2^{w-1}$−1−e) when ($\underline{d}_i$) is not (1), and computing (Q−T[j]) and updating (Q) when ($\underline{d}_i$) is (1), and computing (Q−T[j]) and updating (Q) if ($\underline{d}_i$) is not (1).

18. The elliptic curve cryptography method according to claim 17, further comprising determining whether (i) is (r+1−w), wherein, when (i) is not (r+1−w), (i) is updated to the result of subtracting (1) from (i) and the operation returns to the encoding.

19. The elliptic curve cryptography method according to claim 18, further comprising, when (i) is (r+1−w):

updating (Q) to the result of multiplying (Q) by (r) according to the scalar multiplication;

updating (e) to results of multiplication ($\underline{d}_{r-1}\underline{d}_{r-2}, \ldots, \underline{d}_0$), updating (j) to (e) if ($d_i$) is (1), and updating (j)−" to (e'=$2^{w-1}$−1−e" if "$d_i$) is not (1); and outputting (Q+T[j]) as (Q) if ($\underline{d}_i$) is (1), and outputting (Q−T[j]) as the public key (Q) when ($d_i$) is not (1).

20. An elliptic curve cryptography method which generates a public key usable in communication encryption using an elliptic curve, comprising:

changing a number of a secret key to an odd number;

using at least one processing device encoding the secret key to yield an encoded secret key in which a most significant bit (MSB) is 1 and a rest positional number is 1 or −1; and computing the public key by multiplying the encoded secret key by a predetermined point on the elliptic curve by scalar multiplication.

21. The method of claim 20, wherein the scalar multiplication is performed using a signed binary right-to-left algorithm.

22. The method of claim 20, wherein the scalar multiplication is performed using an encoded Montgomery algorithm.

23. The method of claim 20, wherein the scalar multiplication is performed using fixed code windowing.

24. A method of preventing leakage of a secret key during encryption and decryption during communication using elliptical curve cryptography which generates a public key usable in the communication, comprising:

changing a number of a secret key to an odd number;

using at least one processing device encoding the secret key to yield an encoded secret key in which a most significant bit (MSB) is 1 and a rest positional number is 1 or −1; and computing the public key by multiplying the encoded secret key by a predetermined point on the elliptic curve by scalar multiplication.

\* \* \* \* \*

UNITED STATES PATENT AND TRADEMARK OFFICE
CERTIFICATE OF CORRECTION

PATENT NO.        : 7,676,037 B2
APPLICATION NO.   : 11/014905
DATED             : March 9, 2010
INVENTOR(S)       : Bae-eun Jung et al.

It is certified that error appears in the above-identified patent and that said Letters Patent is hereby corrected as shown below:

Column 10, Line 28, after "secret" insert --key--.

Column 11, Line 47, change "(1)," to --(1);--.

Column 12, Line 1, change "(Q-T[j])" to --(Q+T[j])--.

Column 12, Line 13, change "$(d)_l$)" to --$(d)_l$--.

Signed and Sealed this

First Day of June, 2010

David J. Kappos
*Director of the United States Patent and Trademark Office*